Aug. 11, 1959 M. A. WEISS 2,899,072
CONVEYOR RACKS
Filed July 3, 1957 3 Sheets-Sheet 3
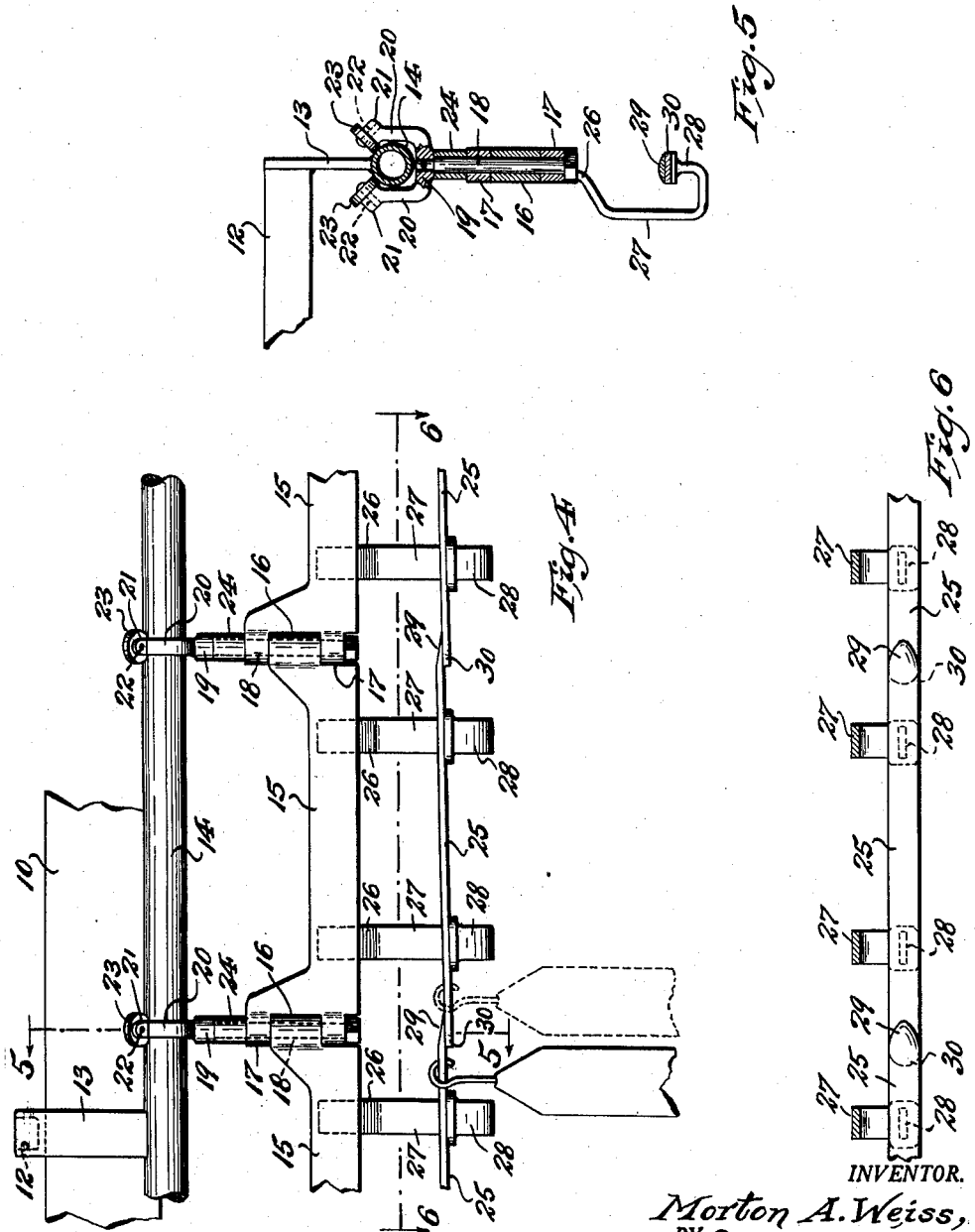
INVENTOR.
Morton A. Weiss,
BY Richards & Cifelli,
Attorneys

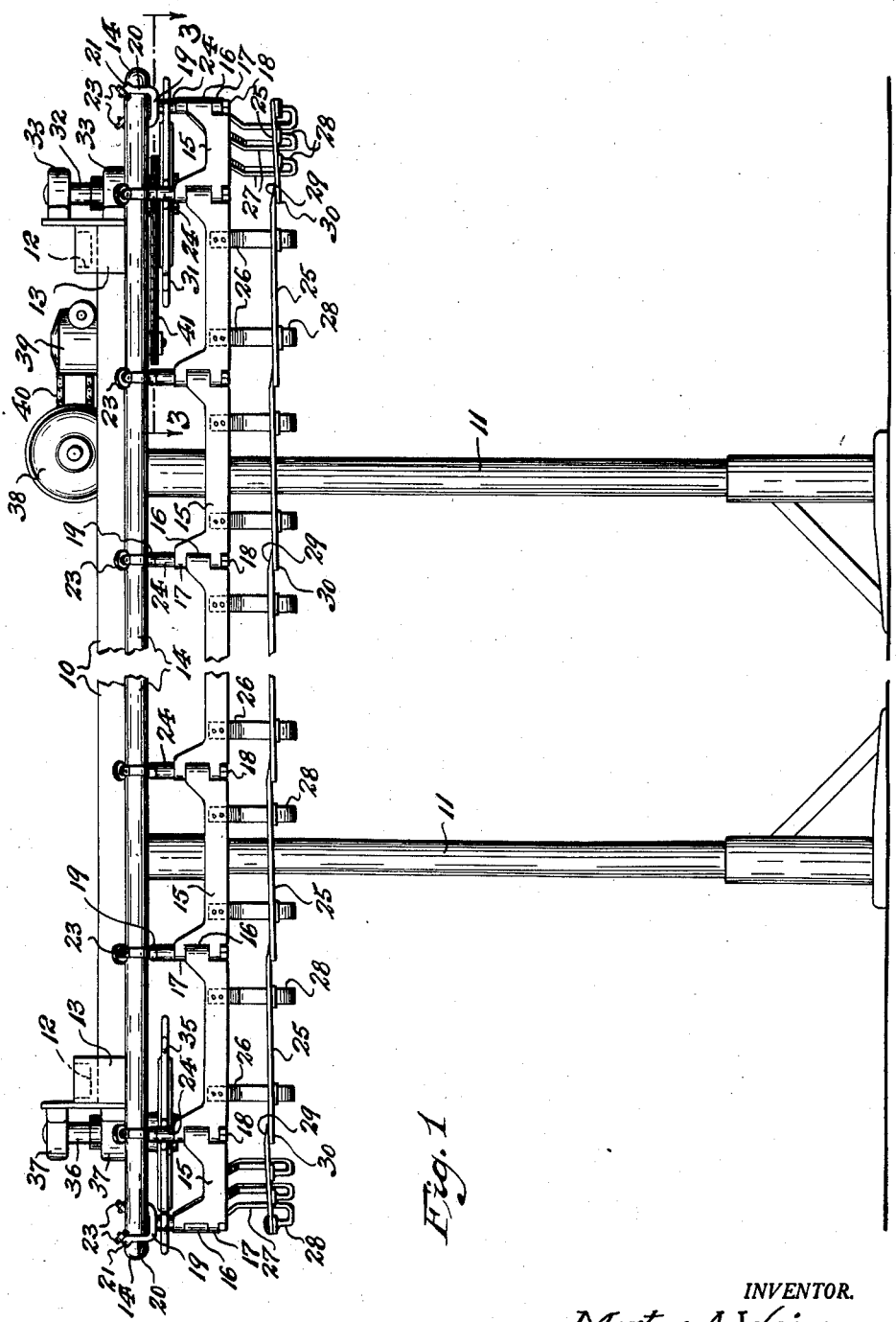

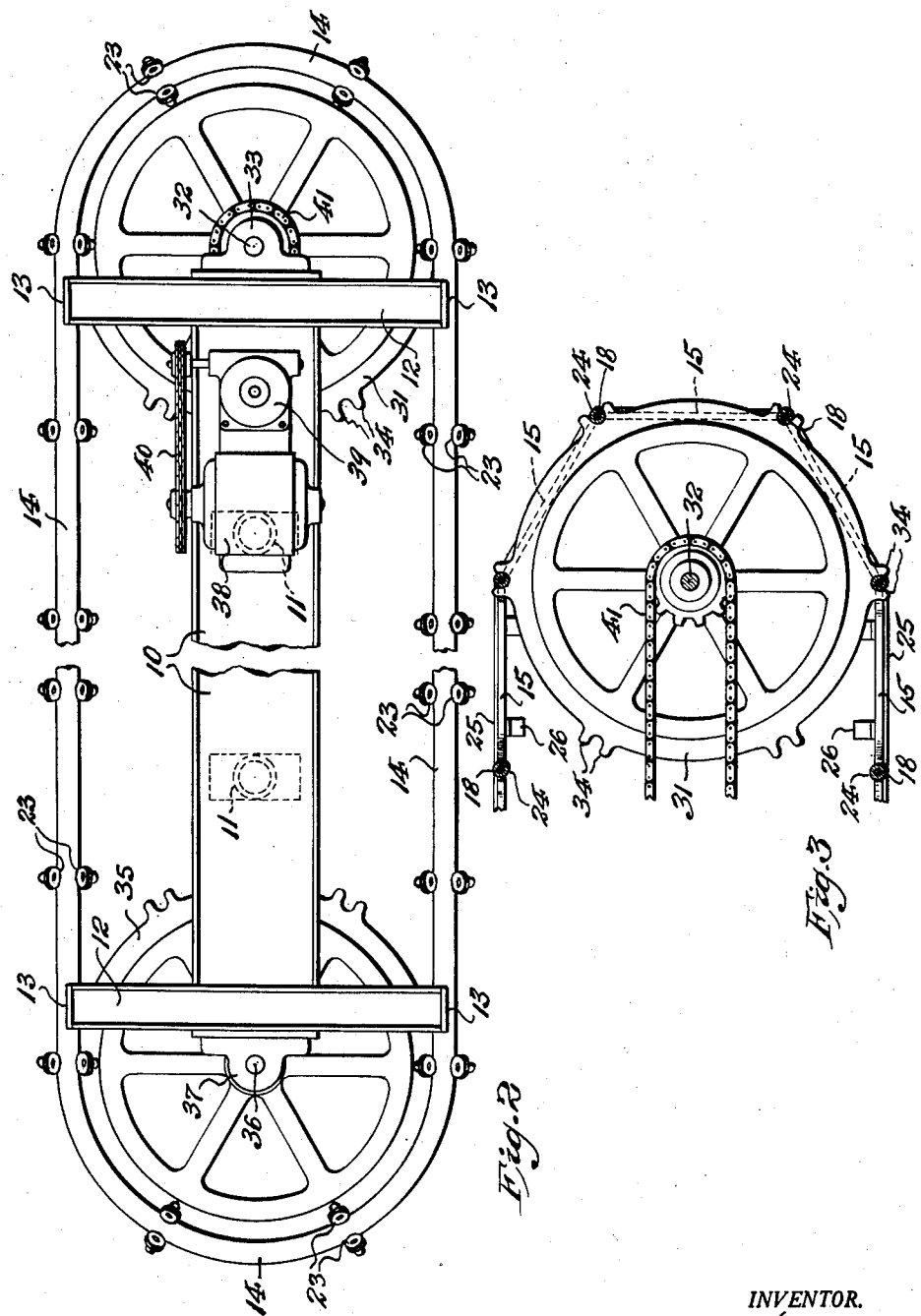

United States Patent Office 2,899,072
Patented Aug. 11, 1959

2,899,072

CONVEYOR RACKS

Morton A. Weiss, Springfield, N.J., assignor to White Machine Company, Inc., Kenilworth, N.J., a corporation of New Jersey Application July 3, 1957, Serial No. 669,820

10 Claims. (Cl. 211—1.5)

This invention relates to improvements in conveyor racks for storing articles, merchandise, processed work or the like subject to quick and easy identification and selection when availability and removal thereof is required; and the invention has reference more particularly to an improved conveyor rack for use in call offices of dry cleaning or other work processing establishments, laundries and the like.

In the operation of garment dry cleaning and similar work processing establishments, it is customary to provide a call office at which the customer leaves garments desired to be cleaned, and to which the customers return to receive delivery of the cleaned garments. The garments received for cleaning from each customer are suitably identified, e.g. by assigned or order numbers. After cleaning, the garments, identified by the assigned or order numbers, are returned to the call office for delivery to the customers, and are there stored on a rack awaiting call of the customers. It is desirable to arrange the garments on the storage rack in consecutive order according to their identifiying numbers. Upon call of a customer, the call office attendant, ascertaining the number identifying the customer's garment, removes such identified garment from the storage rack, and delivers the same to the customer.

Having the above in view, it is an object of this invention to provide an improved power driven, circulatory storage rack for call office use which is provided with an endless rack rail upon which cleaned garments, ready for delivery to the customers, can be suspended in the consecutive order of their identifying numbers; said rack rail being adapted to be circulated, whereby to move the stored garments around the rack to the call office attendant, until the desired garment is presented for selection, removal and delivery to the customer.

This invention has for a further object to provide a storage rack equipped with a power driven circulatory rack rail to receive suspended garments, said rack rail being uninterruptedly continuous, and preferably comprising successive sections in novel lapped relation one to another, so that garments can be manually moved upon and along the same, without obstruction, whereby, when garments are removed for delivery, remaining garments can be easily and quickly pushed together, and new work, comprising additional cleaned garments, can be added to the stored accumulation of garments on the rack, all in such manner as to constantly maintain correct numerical sequence of the identifying numbers of the work. By reason of such novel construction of the rack rail, no barriers to work adjustment on the rack is involved, and the full storage capacity of the rack is constantly available.

The above and other objects will be understood from a reading of the following description of an illustrative embodiment of this invention in connection with the accompanying drawings thereof, in which:

Fig. 1 is a side elevational view of a storage conveyor rack embodying the principles of this invention; Fig. 2 is a top plan view of the same; and Fig. 3 is a fragmentary horizontal sectional view, taken on line 3—3 in Fig. 1.

Fig. 4 is a fragmentary side elevational view of the conveyor rack, showing rack rail sections thereof; Fig. 5 is a fragmentary vertical cross sectional view, taken on line 5—5 in Fig. 4; and Fig. 6 is a fragmentary horizontal sectional view, taken on line 6—6 in Fig. 4.

Referring to the drawings, in which like characters of reference indicate corresponding parts, the reference character 10 indicates the longitudinal carrier plate or beam of the conveyor rack, the same being supported by upstanding, floor footed, standards or columns 11. Suitably affixed to the carrier plate or beam 10, as by welded connection therewith, are a plurality of longitudinally spaced cross bars 12. Affixed to the opposite ends of these cross bars 12, as by welded connection therewith, and so as to depend therefrom, are hanger plates 13. Suspended by these hanger plates 13, for disposition in horizontal plane, is an elongated endless track member 14, which surrounds the carrier plate or beam 10 of the conveyor rack in outwardly offset relation thereto.

Suspended from the track member 14, for circulatory travel around the same, is a continuous rack rail structure. This rack rail structure comprises a series of frame members or links 15, which are pivotally connected together in end to end relation to provide an endless or continuous interlinked assembly thereof. To so pivotally interconnect the frame members or links 15, adjoining ends thereof are respectively provided with a male hinging knuckle 16 and a bifurcate female hinging knuckle 17. Extending upwardly through the adjoined male and female hinging knuckles 16 and 17 are pivot or hinge pins 18. To the upper end of each pivot or hinge pin 18 is affixed a trolley yoke 19, having upstanding laterally spaced apart arms 20 adapted to straddle the track member 14. Said yoke arms 20 terminate in angular bearing portions 21 which carry axle pins 22 upon which are rotatably mounted traction rollers 23. Opposite traction rollers 23 are respectively disposed in radially angular relation to the track member 14, so as to bear against and ride upon opposite sides of the top surface of the latter, thus suspending the interlinked assembly of frame members or links 15 subject to circulatory travel around the track member 14.

Mounted on each pivot or hinge pin 18, between the pivotally connected ends of adjoined frame members or links 15 and the trolley yokes 19, are rotatable bushings or sleeves 24.

Carried by each frame member or link 15 of the rack rail structure is a rack rail section 25. Each said rack rail section 25 is suspended beneath a corresponding frame member of link 15 by spaced hanger members 26, which are suitably affixed to the latter to depend therefrom. Said hanger members 26 are preferably provided with inwardly offset portions 27, the lower ends of which terminate in outwardly offset, upturned portions 28 to which a rack rail section 25 is affixed, so as to be supported by said hanger members in downwardly spaced and substantially longitudinally aligned parallel relation to a frame member or link 15.

As thus supported by the frame members or links 15, the rack rail sections 25 form an endless or continuous end to end assembly thereof, wherein an end portion 29 of one rack rail section will overlap an end portion 30 of an adjoining rack rail section; the overlapping end portion 29 being tapered or chamfered, whereby the top sides of the assembled rack rail sections provide a substantially smooth surface, free from shoulders or projections likely to offer obstruction to free and easy sliding of garment hangers, or other article suspension means, upon and along the rack rail from one section to another thereof. In other words, the assembly of rack rail sections provides an endless or continuous slick rail for the reception of articles or materials to be suspended therefrom and adjustably moved thereover as may be required.

The means for driving the rack rail structure for circulatory movement upon and around the track member 14 comprises a drive sprocket 31, which is disposed in concentric relation to a semi-circular end portion of the continuous track member 14, and in a plane to engage the rotatable sleeves or bushings 24 associated with pivotally adjoined ends of the frame members or links 15 of the rack rail structure (see Figs. 1, 2 and 3). The driven sprocket 31 is fixed upon a perpendicular drive shaft 32 that is journaled in pillow block bearings 33, the latter being suitably supported in connection with an end portion of the carrier plate or beam 10 of the conveyor rack. Said drive sprocket 31 is provided with sprocket teeth 34 so circumferentially spaced as to match with and engage the sleeves or bushings 24 associated with pivotally adjoined ends of the frame members or links 15 of the rack rail structure, whereby, when the drive sprocket 31 is rotated, said sprocket will propel the rack structure in circulatory movement upon and along the track member 14. A similar idler sprocket 35 is preferably mounted concentric to the opposite semi-circular end portion of the continuous track member 14, so as to similarly engage and support the rack rail structure for operatice circulatory movement. This idler sprocket 35 is also fixed upon a perpendicular shaft 36 that is journaled in pillow block bearings 37 suitably supported in connection with the opposite end portion of the carrier plate or beam 10 of the conveyor rack (see Figs. 1 and 2).

Any suitable power applying means may be utilized to operate the drive sprocket 31. An illustrative means for this purpose (as shown in Figs. 1 and 2) comprises an electric motor 38 which is supported upon the carrier plate or beam 10. A gear reduction means 39 is also mounted on the carrier plate or beam 10, the power input side of which is adapted to be driven by the motor 38 through an interconnecting chain and sprocket transmission 40. The drive sprocket 31 is adapted to be driven from the power output side of the gear reduction means 39 by a chain and sprocket transmission 41 which drives the shaft 32 by which said drive sprocket 31 is actuated.

Starting and stopping of the motor 38 is adapted to be controlled by suitable manipulatable switch means (not shown) which is included in the electric power circuit by which said motor is served. The motor 38 may be of the reversible type, so as to optionally drive the rack rail structure in one or an opposite direction.

In the use and operation of the conveyor rack of this invention, assuming for example it is installed in a call office of a dry cleaning establishment, hanger carried garments which have been cleaned, and are ready for return to the customers when called for, and which are identified by initially assigned order numbers, are suspended by their carrying hangers (see Fig. 4) on the rack rail structure in consecutive order according to their identifying numbers. When a given order is called for, the call office attendant starts operation of the conveyor rack, so as to circulate the rack rail structure until the desired order comes to hand, whereupon such order is removed and delivered to the customer.

During circulatory movement of the rack rail structure, the garments, suspended by their hangers thereon, will accompany the movement of the rack rail structure without relative displacement. As the rack rail structure progresses around the curved ends of the track member 14, the adjoined lapped ends of the rack rail sections 25 will rotatively slide, one relative to the other, so as to accommodate the movement thereof around the curved path of transit, all without tendency to disturb or crowd together the suspended garments during such transit.

When orders are removed, the remaining orders can be easily and quickly pushed together over and upon the slick rack rail, thus consolidating the same without disturbing the numerical sequence thereof. The orders being thus consolidated, additional or new work can be added to the accumulation of orders, stored on the conveyor rack, in desired sequence according to the identifying numbers thereof, so that perfect consecutive numerical sequence of stored work can be easily maintained, and the full capacity of the conveyor rack availed of.

Having now described my invention, I claim:

1. A conveyor rack for storing material subject to selection and removal therefrom comprising an endless track, a rack rail structure to carry stored material said rack rail structure comprising a series of frame members pivotally interlinked in end to end relation to provide a continuous assembly thereof, means to suspend said frame members from the track for movement around the latter, a rack rail section dependent from each frame member, for disposition in downwardly spaced parallel relation thereto said rack rail sections being also disposed in end to end relation with adjoining ends lapping one over the other, and the overlapping end of each rack rail section being chamfered whereby the end to end assembly of said rack rail sections provides a continuous slick rail adapted to permit unobstructed adjustable movement thereover of stored material carried thereby.

2. A conveyor rack for storing material subject to selection and removal therefrom comprising an endless track, a rack rail structure to carry stored material said rack rail structure comprising a series of frame members arranged in end to end relation, means to pivotally connect adjoining ends of said frame members to provide a continuous articulated assembly thereof, traction means aligned and connected with said pivoted connections and operative to ride on the track, whereby to suspend the frame members from and for movement around the track, a rack rail section carried by each frame member, hanger members to suspend respective rack rail sections from corresponding frame members, said rack rail sections being also disposed in end to end relation with adjoining ends lapping one over the other, and the overlapping end of each rack rail section being chamfered whereby the end to end assembly of the rack rail sections provides a continuous slick rail adapted to permit unobstructed adjustable movement thereover of stored material carried thereby.

3. A conveyor rack according to claim 2 including power actuated means to drive the rack rail structure for circulatory movement along and around the track.

4. A conveyor rack for storing material subject to selection and removal therefrom comprising an endless track, a rack rail structure to carry stored material and adapted to be moved along and around the track, said rack rail structure comprising a series of frame members arranged in end to end relation, means to pivotally connect adjoining ends of said frame members to provide a continuous articulated assembly thereof, said pivotal connections terminating at their upper ends in trolley yokes straddling the track, said trolley yokes having traction rollers to ride upon the track, said trolley yokes and traction rollers being operative to suspend the rack rail structure from and for movement around the track, a rack rail section caried by each frame member, hanger members dependent from each frame member, said hanger members having outwardly offset upturned lower end portions to support a rack rail section carried thereby, said rack rail sections being also disposed in end to end relation with adjoining ends lapping one over the other, and the overlapping end of each rack rail section being chamfered whereby the end to end assembly of the rack rail sections provides a continuous slick rail adapted to permit unobstructed adjustable movement thereover of stored material carried thereby.

5. A conveyor rack according to claim 4 including power actuated means to drive the rack rail structure for circulatory movement along and around the track.

6. A conveyor rack according to claim 5 wherein the power actuated means to drive the rack rail structure comprises a sprocket having teeth spaced to mesh with porions of the pivoted connections which join the frame members of the rack rail structure, an electric motor, and power transmission means between said motor and sprocket.

7. A conveyor rack for storing material subject to selection and removal therefrom comprising an endless track, a rack rail structure to carry stored material, said rack rail structure comprising a series of frame members pivotally interlinked in end to end relation to provide a continuous articulated assembly thereof, means to suspend said frame members from the track for movement around the latter, and a continuous rack rail means adapted to permit unobstructed adjustable movement thereover of stored material carried thereby, and hanger means to suspend said rack rail means from the interlinked frame members.

8. A conveyor rack for storing material subject to selection and removal therefrom comprising an endless track, a rock rail structure to carry stored material and adapted to be moved along and around the track, said rail structure comprising a series of frame members arranged in end to end relation, means to pivotally connect adjoining ends of said frame members to provide a continuous articulated assembly thereof, said pivotal connections terminating at their upper ends in trolley yokes straddling the track, said trolley yokes having traction rollers to ride upon the track, said trolley yokes and traction rollers being operative to suspend the frame members from movement around the track, hanger means dependent from said frame members, said hanger means having upturned lower end portions, and a continuous slick rack rail means supported by the upturned lower end portions of the hanger members, said rack rail means being adapted to permit unobstructed adjustable manually effected movement thereover of stored material carried thereby.

9. A conveyor rack according to claim 8 including power actuated means to drive the rack rail structure for circulatory movement along and around the track.

10. A conveyor rack according to claim 9 wherein the power actuated means to drive the rack rail structure comprises a sprocket having teeth spaced to mesh with pivoted connections which join the frame members of the rack rail structure, an electric motor, and power transmission means between said motor and sprocket.

References Cited in the file of this patent

UNITED STATES PATENTS

| | | |
|---|---|---|
| 928,980 | Kaufman et al. | July 27, 1909 |
| 1,717,246 | Perling | June 11, 1929 |
| 1,976,448 | Lawler | Oct. 9, 1934 |
| 1,998,109 | Walter | Apr. 16, 1935 |
| 2,778,504 | Byrne | Jan. 22, 1957 |